Dec. 5, 1939.　　P. W. JANEWAY, JR　　2,182,696
CONTROL SYSTEM
Filed March 13, 1939　　2 Sheets-Sheet 1

Inventor:
Price W. Janeway
by his Attorneys
Howson & Howson

Dec. 5, 1939.          P. W. JANEWAY, JR          2,182,696
CONTROL SYSTEM
Filed March 13, 1939          2 Sheets-Sheet 2
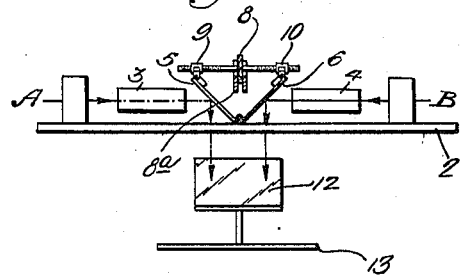
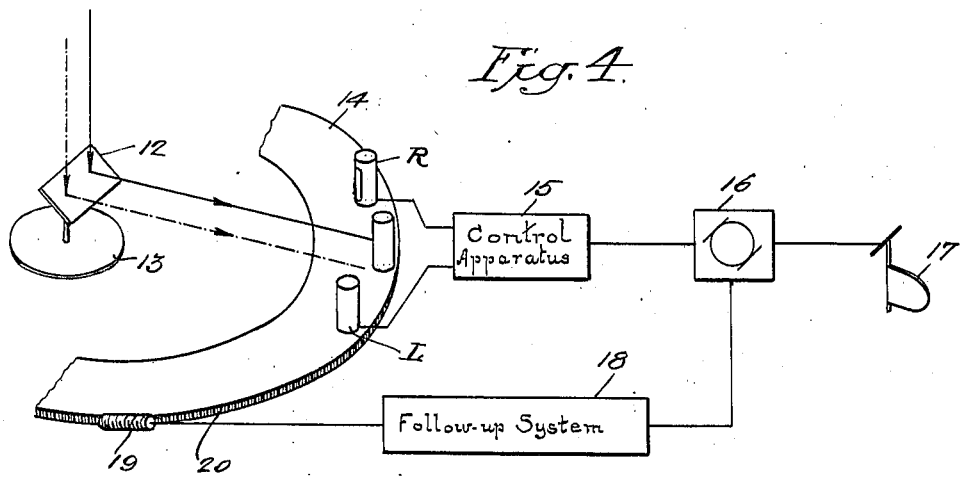
Inventor:-
Price W. Janeway
by his Attorneys
Howson & Howson Patented Dec. 5, 1939

2,182,696

UNITED STATES PATENT OFFICE 2,182,696

CONTROL SYSTEM

Price W. Janeway, Jr., Media, Pa., assignor to Britton Chance, Mantoloking, N. J.

Application March 13, 1939, Serial No. 261,638

8 Claims. (Cl. 172—239)

This invention relates to electrical control apparatus of the follow-up type and, more particularly, to a novel system of this character wherein the follow-up action is effected in a novel manner to produce varying control effects.

Electrical control systems of the follow-up type may be said to include generally some control means including relatively movable elements, a telemotor system operable by the control means for performing the desired control action, and a follow-up system operable by the telemotor to produce follow-up relative movement between the said control elements so as to restore the normal quiescent condition of the control means. Thus, in the case of an automatic steering system for dirigible craft, such as ships, there is provided some control means constructed and arranged to be responsive to deviations of a craft from its course, a telemotor system including a steering motor operable by the control means to effect throw of the craft's steering rudder, and a follow-up system operable by the telemotor to restore the control means to its normal quiescent condition.

Since any telemotor system will inherently introduce error whenever the direction of operation changes, due to time lag in the operation of its parts, it is practically necessary to compensate for such error. Further, in the case of an automatic steering system, it is frequently desired to give the rudder a relatively great throw whenever the craft changes its direction of yaw, the rudder throw being in a direction to tend to overcome the yaw or deviation and bring the craft back on its course. This action, which is commonly referred to as "initial rudder" is introduced by causing the steering motor to operate for a relatively long period of time when the direction of the craft's yaw changes.

By the present invention, there is provided a novel method and means for compensating for telemotor error and, if desired, for introducing initial rudder action. While the invention is applicable generally to control systems of the follow-up type, it will be described with particular reference to an automatic steering system since it is particularly adapted for use in such a system.

The principal object of the invention is to provide in a system of the stated character novel means for producing and combining different effects so as to produce a resultant follow-up action which compensates for telemotor error and which may also introduce initial rudder action whenever desired.

Other more specific objects of the invention, as well as the novel features thereof, may be more clearly understood by reference to the accompanying drawings.

In the drawings:

Fig. 3 is a diagrammatic elevational view of such device;

Fig. 4 is a diagrammatic illustration of an automatic steering system embodying the invention.

Figure 1:
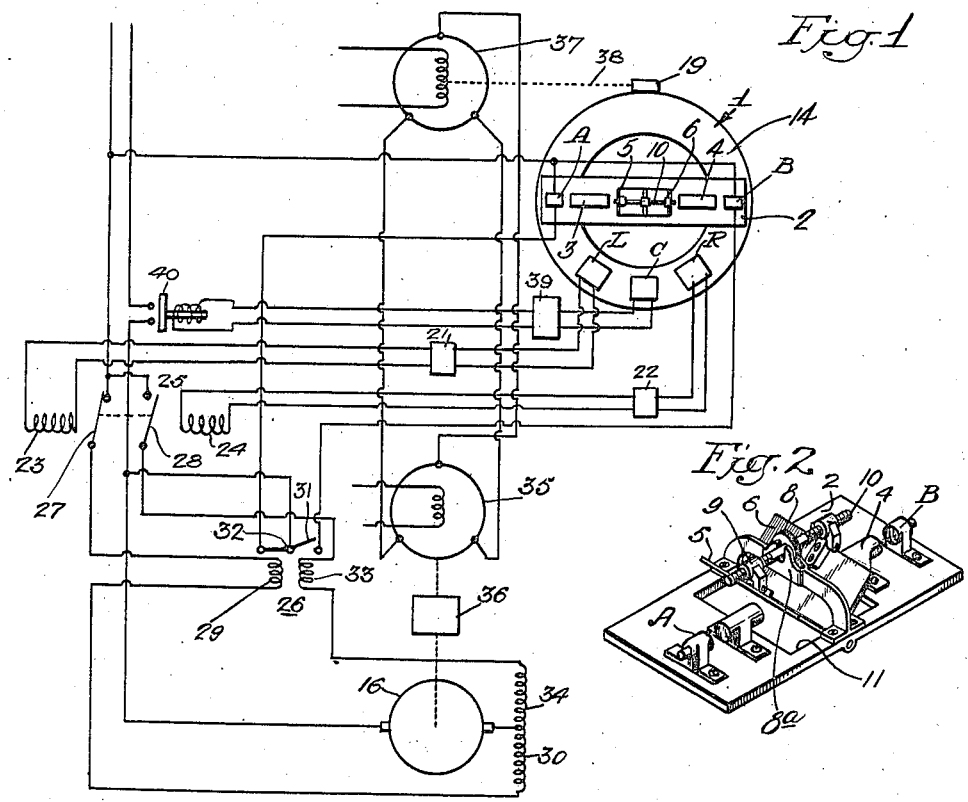
Fig. 1 is a diagrammatic illustration of a system embodying the invention.

Referring first to Fig. 1, there is provided a control device 1 employing light sources A and B which are adapted to provide two light beams that are projected by the mechanism, hereinafter described, toward the light-sensitive cells L, C, and R. The outer cells L and R control the operation of the system in either direction, as will be discussed in detail hereinafter. The center cell C functions to deenergize the system, as will be described further hereinafter.

Figure 2:
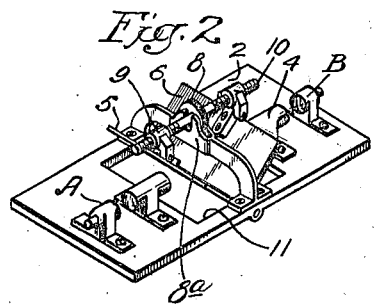
Fig. 2 is a perspective view of a portion of the control device.
Figure 5:
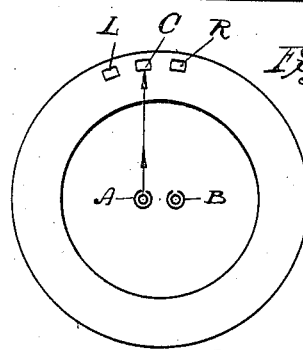
Figs. 5 to 8 are explanatory illustrations of the operation of the invention.

As shown in Fig. 2, the light sources A and B may comprise lamps mounted upon a horizontal support 2 in opposing spaced relation. Lens devices 3 and 4 are preferably associated respectively with the light sources, as illustrated, to concentrate the light beams from the sources. Centrally of the support 2, there are provided a pair of pivotally mounted reflectors 5 and 6, the pivot for these reflectors being shown at 7. The reflectors are adjustable about their pivot by means of thumb screw 8 loosely carried by bracket 8a and having left and right hand threads engaging respectively nut members 9 and 10 hingedly mounted on the reflectors. It will be seen that by turning the thumb screw 8, the inclination of the reflectors with respect to the vertical may be varied. The reflectors receive the light beams and direct them downward through the opening 11.

As shown in Fig. 3, the light beams from the reflectors 5 and 6 are received by a reflector or mirror 12 which, in turn, directs the beams toward the light cells. Since only one light source is energized at a time, the light beam from source B is shown by the solid line representation, while the broken line illustrates the path of the beam from source A when the latter is energized. Preferably, the mirror 12 is mounted on the compass card 13 of a magnetic compass so that it remains in fixed position. The light-sensitive cells are arranged so as to be movable relative to the light beams reflected from the compass card reflector, as described further hereinafter.

In Fig. 4, there is illustrated digrammatically an automatic steering system with which the invention may be employed. The compass card reflector 12 is shown mounted on the compass card 13. A portion of the cell support is shown at 14. As indicated in the figure, the outer cells L and R function through control apparatus indicated generally at 15 to control a steering motor 16 which operates the rudder 17. The steering motor 16 also operates the follow-up mechanism indicated generally at 18 to drive a follow-up worm 19 meshing with worm-wheel teeth 20 on the cell support. The follow-up action tends to restore the normal condition of the system as will be understood.

In accordance with the present invention, the two light sources are selectively controlled in a manner to vary the follow-up action so as to compensate for telemotor error and also introduce initial rudder action, if desired. Referring again to Fig. 1, the outer cells L and R are connected respectively through amplifiers 21 and 22 to windings 23 and 24 of a double-acting relay 25. The amplifiers 21 and 22 may be conventional vacuum tube amplifiers which serve to amplify the current impulses from the cells sufficiently to operate the relay 25. The relay controls the motor 16 and also controls a second relay 26 which, in turn, controls the energization of the light sources. When the cell R is activated, the relay winding 24 is energized, causing the contacts of relay 25 to assume the position shown. In this instance, the contact arm 27 is closed, while arm 28 is opened. A circuit is thus completed from one supply line through contact arm 27, winding 29 of relay 26, field winding 30 of motor 16 and the armature of the motor back to the other supply line. Consequently, the motor 16 operates in a direction to effect the desired control action and also operates the follow-up system in the proper direction. At the same time, the energization of winding 29 causes the armature of relay 26 to assume the position shown. This armature comprises an arm 31 pivoted at 32 and having the portions on the opposite sides of the pivot disposed as illustrated. It will be clearly seen from the electrical connections that when winding 29 is energized, the relay energizes light source B, while the light source A is deenergized.

When the left hand cell L is activated, winding 23 of relay 25 is energized and, at that time, a circuit is completed from one supply line through closed contact 28, winding 33 of relay 26, field winding 34 of motor 16, and the armature of the motor back to the other supply line. Consequently, the motor operates in the opposite direction and the relay 26 is actuated to deenergize light source A and energize light source B. It will be noted that only one of the light sources is energized at one time.

While any suitable follow-up drive may be employed, there is preferably employed a drive of the Selsyn type. In the specific illustration, the motor 16 drives a self-synchronous transmitter 35 through a suitable control mechanism 36 which may take the form of a manually variable speed transmission. The transmitter 35 in turn controls a self-synchronous receiver 37 which operates the follow-up worm 19, for example, by means of a flexible drive shaft indicated at 38.

A simple Selsyn system of the type illustrated is now well understood and requires no detailed discussion.

The center cell C is connected through amplifier 39 to relay 40, as illustrated, so that when a light beam impinges on cell C, the relay 40 opens the supply line to deenergize motor 16.

Figure 6:
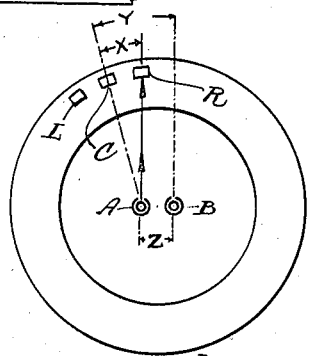
Figure 7:
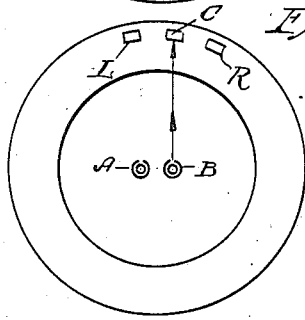

The complete operation of the system may be clearly understood by reference to Figs. 5 to 8. Let it be assumed first that the condition illustrated in Fig. 5 obtains, that is, the light source A is energized while the light source B is deenergized. In the quiescent state of the system, the light beam from source A impinges on the center cell C. Now assume that the cell support moves in a direction such that the cell R is brought into alignment with the beam, as shown in Fig. 6. Accordingly, the cell R is activated and through the apparatus above described serves to operate the control motor 16 in a direction to effect control action tending to restore the normal condition. In the case of an automatic steering system for a ship, for example, the steering motor would operate the rudder in a direction to tend to bring the ship back on its course in response to the deviation which caused movement of the cells relative to the light beam. The control motor also operates the follow-up drive in a direction to move the light cells so as to tend to bring the center cell into alignment with the light beam. However, at the same time the control motor is energized, the relay 26 is actuated so as to deenergize source A and energize source B. Consequently, the cells must be moved further to bring the center cell into alignment with the light beam from source B and thus restore the normal quiescent conditions. In other words, the follow-up means must operate through the arc Y instead of through the smaller arc X, in order to restore the normal condition. It will be seen that the magnitude of the arc Y compared to the arc X is dependent on the distance Z between the light sources or, in the device illustrated, upon the distance between the points of incidence of the reflected beams upon the cells, which is determined by the adjustment of the reflectors 5 and 6. Thus, the amount by which the follow-up action is prolonged is dependent upon the adjustment of reflectors 5 and 6. When the system attains its normal quiescent condition, the light beam from source B impinges on the center cell, as shown in Fig. 7.

If the next deviation takes place in the same direction as the preceding one, there will be no change in the lighting since the control motor is operated in the same direction as it was before and the relay 26 remains in the same position. In such case, the follow-up system operates in normal manner to restore the normal quiescent condition.

Figure 8:
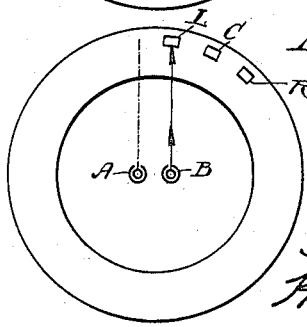

When a deviation takes place in the opposite direction, the light beam from source B impinges upon the left hand cell, as shown in Fig. 8. As a result, the relay 25 is operated to reverse the direction of rotation of the control motor and, at the same time, the relay 26 is actuated to deenergize source B and energize source A. Consequently, as may be seen from Fig. 8, the follow-up action is prolonged as above described. When the normal condition has been restored, the condition of Fig. 5 obtains.

If the next deviation is in the same direction, there is no change in the energization of the light sources and no prolongation of the follow-up system, the latter functioning in normal manner to restore the normal quiescent condition. Upon deviation in the opposite direction, however, the operation above described takes place.

It will be seen that the apparatus operates to delay the restoration of the beam on the center cell in response to the first deviation in either direction, but not in response to subsequent deviations in the same direction. Obviously, by adjusting the positions of the light beams relative to one another, the apparatus may be made to compensate for telemotor error and, if desired, the adjustment may be such as to introduce initial rudder action.

While the reflected beams are shown substantially parallel to each other in the illustrations of Figs. 3 and 4, it will be apparent that this condition will obtain for only one adjustment of reflectors 5 and 6. As the reflectors are moved toward one another from the positions shown in Fig. 3, the reflected beams will become divergent thereby increasing the distance between the points of incidence of the beams on the cells. As the reflectors are moved away from each other from the positions of Fig. 3, the reflected beams will become convergent thereby decreasing the distance between the points of incidence of the beams on the cells. Obviously this distance may be decreased to zero, in which case the follow-up action will not be prolonged, if it is desired to operate the system in this manner.

It will be apparent that the invention is not limited to the specific illustration hereof, but is capable of various other embodiments and modifications.

I claim:

1. In an electrical control apparatus of the follow-up type, a pair of spaced light sources, a light-sensitive device, means for rendering one only of said sources effective to produce a light beam interceptable by said light-sensitive device, means operable to effect a control function in response to activation of said light-sensitive device by said light beam, follow-up means for effecting follow-up relative movement between the light beam and said light-sensitive device, and means for rendering said one source ineffective and the other source effective to produce a light beam displaced from the first-mentioned beam to thereby vary the follow-up action.

2. In an electrical control apparatus of the follow-up type, a control device comprising a pair of spaced light sources and light-responsive means arranged for relative movement, means for rendering one only of said sources effective to produce a light beam interceptable by said light-responsive means, a telemotor system controlled by said light-responsive means, a follow-up system operable by said telemotor to effect follow-up relative movement between the light beam and said light-responsive means, and means for rendering said one source ineffective and the other source effective to produce a light beam displaced from the first-mentioned beam whenever the direction of operation of the system changes, to thereby vary the follow-up action.

3. In an electrical control apparatus of the follow-up type, a control device comprising a pair of spaced light sources and light-responsive means arranged for relative movement, means for rendering one only of said sources effective to produce a light beam interceptable by said light-responsive means, a telemotor system controlled by said light-responsive means, a follow-up system operable by said telemotor to effect follow-up relative movement between the light beam and said light-responsive means, means for rendering said one source ineffective and the other source effective to produce a light beam displaced from the first-mentioned beam whenever the direction of operation of the system changes, to thereby vary the follow-up action, and manually operable means for varying the displacement between said light beams to thereby control the extent of variation of the follow-up action.

4. In an electrical control apparatus of the follow-up type, a control device comprising a pair of spaced light sources and light-responsive means arranged for relative movement, means for selectively energizing said sources to produce a single light beam from one or the other source, a telemotor system controlled by said light-responsive means, a follow-up system operable by said telemotor to effect follow-up relative movement between the light beam and said light-responsive means, and means for actuating said energizing means whenever the direction of operation of the system changes, to thereby shift the light beam and vary the follow-up action.

5. In an electrical control apparatus of the follow-up type, a control device comprising a pair of spaced light sources and light-responsive means arranged for relative movement, switching means for selectively energizing said sources to produce a single light beam from one or the other source, a reversible motor, a relay operable by said light-responsive means to energize said motor, a follow-up system operable by said motor to effect follow-up relative movement between the light beam and said light-responsive means, and means controlled by said relay for actuating said switching means whenever the direction of operation of the system changes, to thereby shift the light beam and vary the follow-up action.

6. In an electrical control apparatus of the follow-up type, a pair of spaced light sources, means for rendering one only of said sources effective, a pair of spaced light-sensitive devices arranged to intercept a light beam from the effective source in response to relative movement in either direction between the light beam and said devices, means operable by said devices to effect a control function, follow-up means for effecting follow-up relative movement between the light beam and said devices, and means responsive to change in direction of operation of the apparatus for rendering said one source ineffective and for rendering the other source effective, to thereby vary the follow-up action.

7. In an electrical control apparatus of the follow-up type, a pair of spaced light sources, means for rendering one only of said sources effective, a center light-sensitive device normally intercepting a light beam from the effective source, means responsive to said device for controlling the operation of the apparatus, a pair of outer light sensitive devices arranged to intercept the light beam in response to relative movement in either direction between the light beam and said devices, means operable by said device to effect a control function, follow-up means for effecting follow-up relative movement between the light beam and said devices, and means responsive to change in direction of operation of the apparatus for rendering said one source ineffective and for rendering the other source effective, to thereby vary the follow-up action.

8. In an electrical control apparatus of the follow-up type, a pair of spaced sources of radiant energy, a device sensitive to said radiant energy, means for rendering one only of said sources effective to produce a beam of radiant energy interceptible by said sensitive device, means operable to effect a control function in response to activation of said sensitive device by said beam, follow-up means for effecting follow-up relative motion between the beam and said sensitive device, and means for rendering said one source ineffective and the other source effective to produce a beam of radiant energy displaced from the first-mentioned beam to thereby vary the follow-up action.

PRICE W. JANEWAY, Jr.